J. A. PEASE.
Pump.
No. 225,488. Patented Mar. 16, 1880.
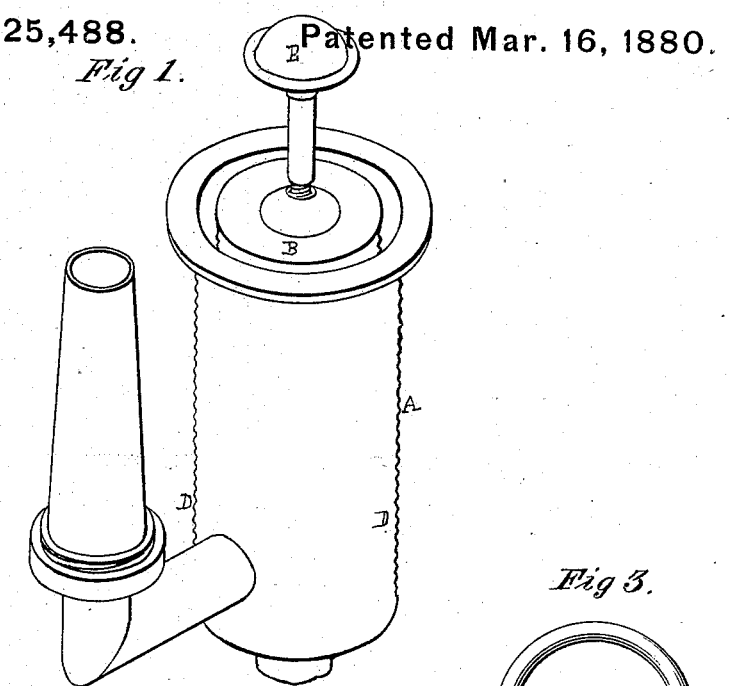
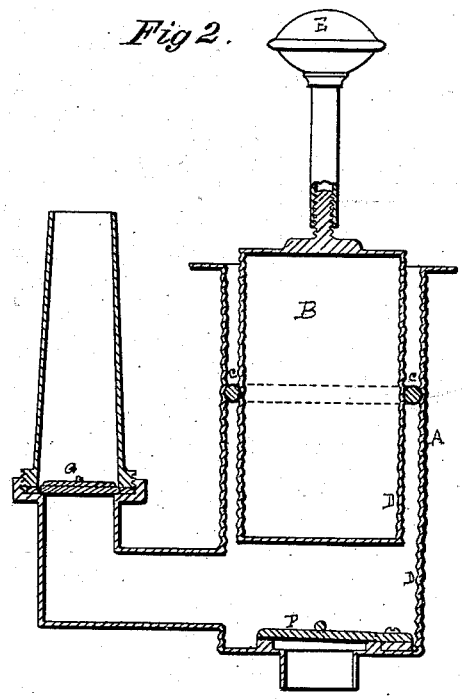
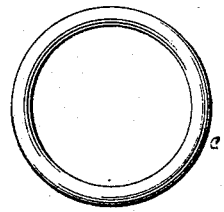
WITNESSES.
E. C. Whitney
O. S. Mason
INVENTOR
Julius A. Pease

UNITED STATES PATENT OFFICE.

JULIUS A. PEASE, OF CHELSEA, MASSACHUSETTS.

PUMP.

SPECIFICATION forming part of Letters Patent No. 225,488, dated March 16, 1880.

Application filed October 3, 1879.

*To all whom it may concern:*

Be it known that I, JULIUS A. PEASE, of Chelsea, State of Massachusetts, have invented a new and useful Improvement in Pumps, which improvement is fully set forth in the following specification and accompanying drawings, in which—

Figure 1 is a perspective view. Fig. 2 is a sectional view, and Fig. 3 is a view of the rubber ring.

The object of my invention is to furnish a pump with a corrugated or grooved cylinder and piston, between which a rubber ring rolls, said corrugations or grooves being for the purpose of preventing the ring from slipping or getting out of position while in operation.

In the drawings, A is the cylinder, corrugated or grooved. B is the piston, also corrugated or grooved. c is the rubber ring that plays or rolls between the cylinder and piston. D D are the corrugations or grooves in the cylinder and on the piston, said corrugations or grooves running around the cylinder and piston, preventing the ring from slipping and getting out of position. E is the handle, such as is intended to be used in portable wash-stands. F is the lower valve, and G the valve in the outlet-pipe.

I do not confine myself to any particular style of pump.

I am aware rubber rings have been used in smooth cylinders and with smooth pistons in pumps, and found not to work satisfactorily. That I do not claim.

What I claim is—

A pump with a corrugated or grooved cylinder and piston, in combination with a rubber ring, substantially as and for the purpose before described.

JULIUS A. PEASE.

Witnesses:
CHARLES A. PEASE,
E. C. WAITTE.